Aug. 16, 1960   P. M. AMERPOHL   2,949,334
CAR WINDOW PLATFORM AND ARM REST FOR CAR
Filed Dec. 22, 1958   2 Sheets-Sheet 1

INVENTOR.
PAUL M. AMERPOHL
BY *M. A. Hobbs*
ATTORNEY

Aug. 16, 1960 P. M. AMERPOHL 2,949,334
CAR WINDOW PLATFORM AND ARM REST FOR CAR
Filed Dec. 22, 1958 2 Sheets-Sheet 2
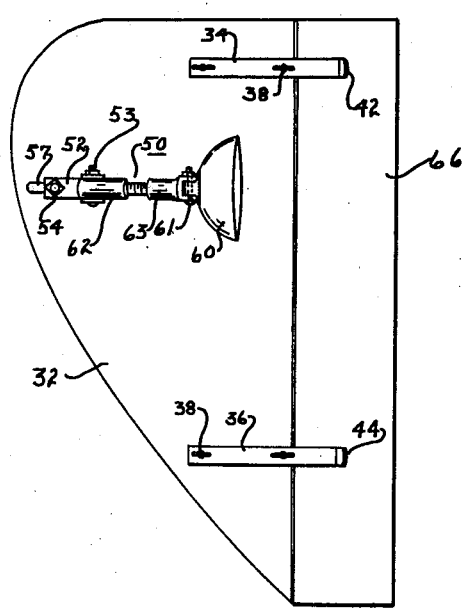
FIG. 4
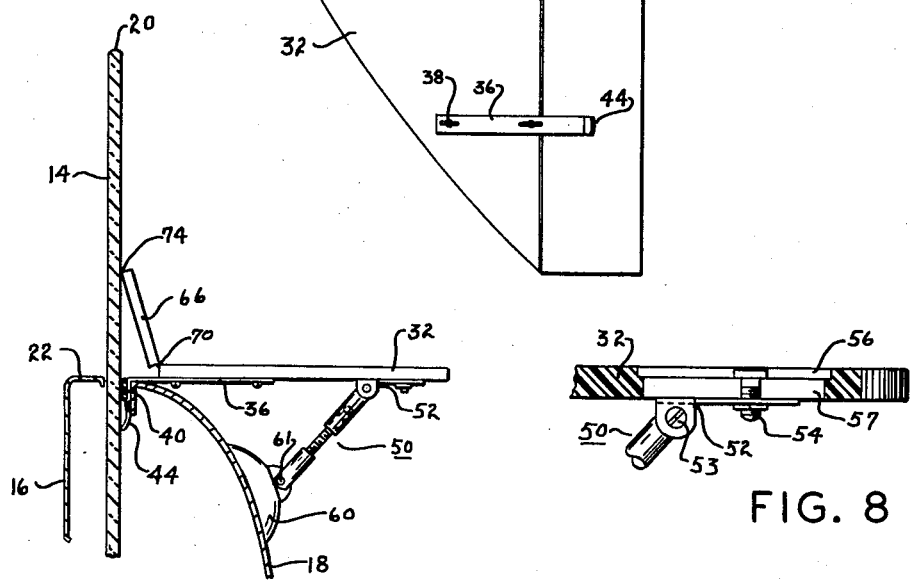
FIG. 7
FIG. 8
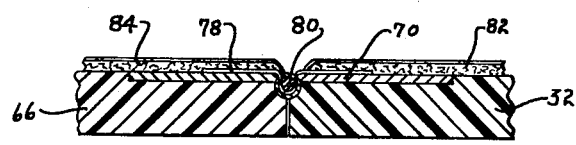
FIG. 5
*INVENTOR.*
PAUL M. AMERPOHL
BY M. A. Hobbs
ATTORNEY _United States Patent Office_

2,949,334
Patented Aug. 16, 1960

2,949,334

CAR WINDOW PLATFORM AND ARM REST FOR CAR

Paul M. Amerpohl, 2822 Southridge Drive, South Bend, Ind.

Filed Dec. 22, 1958, Ser. No. 782,157

6 Claims. (Cl. 311—22)

The present invention relates to a combined window platform and arm rest for a car and more particularly to a platform and arm rest which is semi-permanently attached to the car door along the outside at the lower edge of the window.

One of the principal objects of the present invention is to provide a device which can be easily mounted on and removed from the car door at the lower edge of the window and which serves as an arm rest for the driver or passenger while the car is being driven and as a platform for food, drinks and the like while the car is at a drive-in restaurant, theater or service station.

Another object of the invention is to provide an arm rest and platform combination mounted on the outside of a car door window and having a leaf extending over the lowered window and adjacent door members, the leaf being foldable or retractable to permit the window to be closed without detaching the arm rest from the door.

Still another object of the invention is to provide a device of the foregoing type having a leaf extending over the window and adjacent door portion, which automatically retracts when the window is raised and which automatically assumes its position across the window when the window is lowered fully into the door.

A further object is to provide an arm rest and platform combination adapted to be mounted on the outside of a glass car door window and an inwardly extending leaf which turns upwardly and bears against the glass when the window is raised and serves as a scraper to remove snow, frost and ice when the window is lowered.

Another object of the invention is to provide a device of the aforesaid type which can be quickly installed on a car door adjacent the window and which remains firmly secured in place on the door until it is intentionally removed.

Another object of the invention is to provide an arm rest and platform combination for a car which will remain in place under all normal driving conditions and does not interfere with the operation of the car or car door on which it is mounted.

Additional objects and advantages will become apparent from the following description and accompanying drawings, wherein:

Figure 4 is a bottom view of my device removed from the car;

Figure 5 is an enlarged cross sectional view of the device taken on line 5—5 of Figure 2;

Figure 7 is an elevational end view of the device shown mounted on a car door, in cross section, with the window in raised position and the leaf of my device bearing against the outside surface of the glass; and Figure 8 is an enlarged cross sectional view of an adjustment means, taken on line 8—8 of Figure 2.

Figure 1:
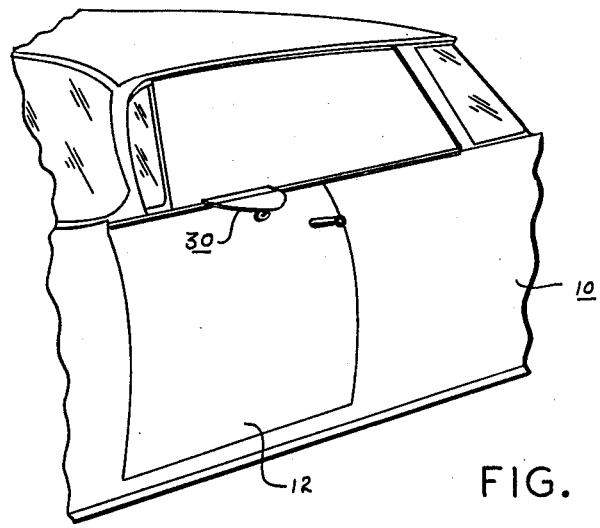
Figure 1 is a perspective view of a portion of the left side of an automobile, showing my arm rest and platform device mounted in operative position on the door.

Referring more specifically to the drawings, numeral 10 designates a portion of the left hand side of a conventional automobile having a door 12 with a glass window 14 which rolls down between the inside and outside panels 16 and 18 to its fully open position and when in this position the upper edge 20 of the glass window is even with or below the upper edges 22 and 24 of the inside and outside panels. My combination arm rest and platform 30 is shown in Figure 1 mounted on door 12 extending over and outwardly from the glass window and is shown installed on a hard-top passenger automobile. The present device 30, hereafter for convenience of description referred to as a window ledge device, is usable on any type of car or truck having windows which roll down into the door or side to open, as on almost all standard cars and trucks, and can be mounted on the front and rear windows of either side; however, it would normally be used on the door next to the driver since it is designed to serve as a rest for the driver's arm during driving.

The device consists of a stationary platform 32 secured at its inner edge to the door by a pair of brackets 34 and 36 attached to the underside of the platform by screws or rivets 38 and extending beyond the inner edge of the platform and downwardly between the inner edge of the outside door panel and the weather strip 40 adjacent the glass window. Brackets 34 and 36 are preferably of metal and the downwardly extending portions 42 and 44, respectively, are slightly curved, bent or wavy to engage and grip either the weather strip or the inner edge of panel 18. These brackets are resilient and function as spring clips, and when pressed downwardly into the space between the panel and the weather strip remain firmly seated therein until intentionally removed. The brackets are preferably adjustable inwardly and outwardly from the inner edge of the platform. The outer edge of the platform is supported by a leg 50 pivotally connected at its upper end to the underside of the platform by an adjustable fixture 51 consisting of an inverted U-shaped member 52 connected by a bolt 53 extending through the downwardly projecting portions of member 52 and through the upper end of leg 50. Member 52 is adjustably joined to the underside of the platform by a bolt 54 supported in upper and lower slots 56 and 57 extending crosswise of platform 32, the head of said bolt preferably being square and of approximately the same size as the width of slot 56 to prevent rotation of the bolt. The lower end of leg 50 is held in position to effectively support the platform by a rubber suction cup 60 pivotally connected to the bifurcated lower end of the leg by a bolt 61 and adapted to grip the outer surface of panel 18. The pivot connections at the top and bottom of the leg permit the leg to be adjusted to various types of doors to position the platform on a horizontal plane. The leg is also adjustable lengthwise by a threaded connection between the upper and lower end portions 62 and 63 of the leg, the threaded portion on portion 63 being screwed inwardly or outwardly in the threaded bore in portion 62.

Figure 2:
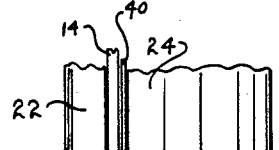
Figure 2 is a top plan view of my device, showing it mounted on a car door with the window glass in its lowered position.
Figure 2:
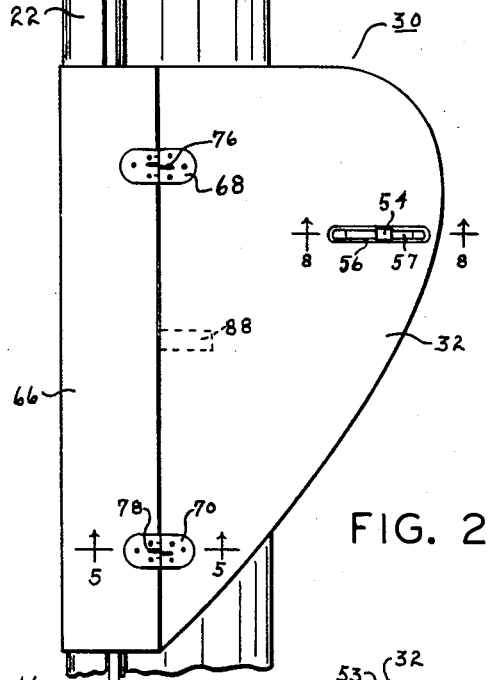
Figure 3:
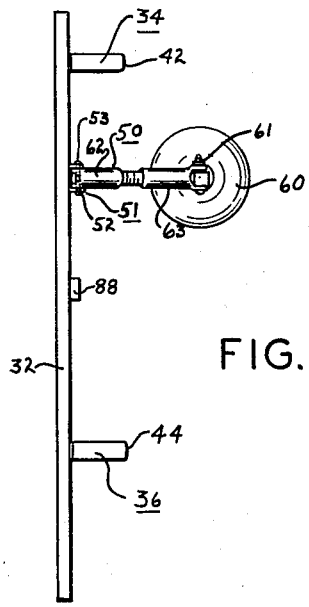
Figure 3 is a side elevational view of the device shown in Figures 1 and 2, removed from the car.
Figure 6:
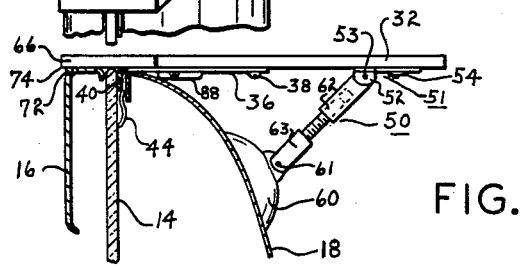
Figure 6 is an elevational end view of my device shown mounted on a car door, in cross section, with the window in its lowered position and the leaf of my device extending inwardly across the top of the glass.

A leaf 66 pivotally attached to the inner edge of platform 32 by a pair of hinges 68 and 70 secured by rivets or screws to the respective parts, lies across the upper edges of panels 16 and 18 and the upper edge of glass window 14, when the window is in its wide open position, i.e. when it is fully lowered into the space between the panels. A rubber or plastic lobe 72 may be provided on the lower side of leaf 66 to contact the upper surface of panel 16. The hinges permit the leaf to fold upwardly when the window is raised, to the position shown in Figure 7, and hence does not interfere with the normal operation of the window and yet provides a support for the driver's arm across the top of the two panels 16 and 18 and window 14. The lower left hand edge 74 of leaf 66, as viewed in Figures 6 and 7, is preferably relatively sharp, at least to the extent of being at right angles, so that when the window is lowered with edge 74 in contact therewith, any snow, ice, frost and much of the dirt splashed on the window while driving in slush will be scraped from the window and directed away from the door by the leaf and platform. Leaf 66 is pressed firmly against the glass and returned from its raised position shown in Figure 7 to its lowered position shown in Figure 6 by springs 76 and 78 looped around pin 80 in the respective hinges and bearing against the upper sides of both halves of the hinges as clearly shown in Figures 2 and 5. While two springs are shown, one will effectively operate the leaf to consistently urge the leaf toward its lowered position, and other types of springs can be used satisfactorily in place of those shown.

The materials from which the platform and leaf are made may be wood, metal, plastic or any other suitable material. However, the upper surface of these may be of importance to the driver when the car is being driven during hot weather, particularly when the sun is shining on the driver's side of the car. It is often desirable to provide padding or other type of covering on the platform and leaf which will not cause discomfort to the user's arm when it is placed on the rest after the rest has been standing in the sun. Porous pads 82 and 84 or the like of fabric through which the air can circulate, such as that illustrated in Figure 5, are preferably secured to the upper surfaces of the platform and leaf, respectively. The pads should be flat and relatively firm so that they will not interfere with the use of the device as a tray.

The manner in which the present device is installed on a car door is relatively simple and does not require any tools or special skills. The downwardly extending portions 42 and 44 of brackets 34 and 36 are pressed downwardly between the upper edge of panel 18 and weather strip 40 until the horizontal portions of the brackets are in contact with the upper edge of panel 18. The positions of leg 50 and suction cup 60 are adjusted on the side of panel 18 to the position at which the outside edge of platform 32 is slightly elevated. The suction cup is then pressed firmly against the surface of the panel to create a firm gripping action between the cup and said surface. The pressing action lowers the outside edge of the platform to the point where the platform is level, as shown in Figures 6 and 7.

In making an installation on some cars it may be necessary to place bracket extensions 42 and 44 between the glass and the inner edge of the weather strip since the space between the strip and panel may not be adapted to receive the extensions.

When used with some cars which have especially thick doors or protruding panels 18, adjustment of leg 50 by screwing portions 62 and 63 inwardly may not be adequate. In this instance, leg 50 can be removed and suction cup 60 attached directly to fixture 51 by removing bolts 53 and 61 and then using bolt 53 to connect the cup directly to the fixture.

Various shapes may be used for the platform and leaf and in some installations the leaf may not be included. A permanent magnet can also be used in place of the suction cup and a magnet 83 can be attached to the inner edge of the platform to assist in holding the platform firmly in place against the steel panel 18 of the car. Further, if the platform is relatively long, two or more legs 50 may be spaced along the edge for additional support. Other modifications and changes than those mentioned herein may be made without departing from the scope of the present invention.

I claim:

1. A window ledge device for automobile having windows adapted to roll down into the door or side, comprising a horizontal stationary platform, brackets secured to the under side of said platform and extending inwardly and downwardly for engaging a portion of the automobile structure adjacent a window, a leg for supporting the outside edge of said platform, a fixture adjustable transversely of said platform for pivotally attaching one end of said leg to the underside of said platform near the outside edge thereof, a suction cup pivotally attached to the other end of said leg for gripping an outside surface of the automobile, a magnet mounted along the inner edge of the platform on the underside thereof, a leaf positioned along the inner edge of said platform and lying across the top of the window when the latter is in its fully opened position, hinges pivotally connecting the leaf to said platform to permit said leaf to fold upwardly and outwardly when the window is raised, a spring for urging said leaf to its first mentioned position, and a support attached to the underside of said leaf for supporting the free edge thereof when the leaf is across the top of the window.

2. A window ledge device for automobiles, comprising a substantially horizontal platform, brackets secured to said platform and extending downwardly for engaging a portion of the automobile structure adjacent a window, a leg pivotally attached at one end to said platform near the outside edge thereof, a suction cup attached to the other end of said leg for gripping an outside surface of the automobile, a leaf positioned along the inner edge of said platform and lying across the top of the window when the latter is in its fully opened position, hinges pivotally connecting the leaf to said platform to permit said leaf to fold upwardly and outwardly when the window is raised, and a resilient means for urging said leaf to its first mentioned position.

3. A window ledge device for automobiles, comprising a platform, brackets secured to said platform and extending downwardly for engaging a portion of the automobile structure adjacent a window, a leg pivotally attached at one end to said platform near the outside edge thereof, a suction cup attached to the other end of said leg for gripping an outside surface of the automobile, and a leaf pivotally attached to the inner edge of said platform and adapted to lie across the top of the window when the latter is in its fully opened position.

4. A window ledge device for automobiles, comprising a platform, brackets secured to said platform and extending downwardly for engaging a portion of the automobile structure adjacent a window, a means attached at one end to said platform, a suction cup attached to the other end of said means for gripping an outside surface of the automobile, a leaf pivotally attached to the inner edge of said platform and adapted to lie across the top of the window when the latter is in its fully opened position, and a resilient means for urging said leaf to its first mentioned position.

5. A window ledge device for automobiles, comprising a platform, brackets secured to said platform and extending downwardly for engaging a portion of the automobile structure adjacent a window, a means attached at one end to said platform, a means attached to the other end of said means for engaging an outside surface of the automobile, a leaf pivotally attached to the inner edge of said platform and adapted to lie across the top of the window when the latter is in its fully opened position, and a resilient means for urging said leaf to its first mentioned position.

6. A window ledge device for automobiles, comprising a platform, means for securing the inner edge of said platform to the automobile structure adjacent a window, a means attached at one end to said platform, a means attached to the other end of said last mentioned means for engaging an outside surface of the automobile, and a leaf pivotally attached to the inner edge of said platform and adapted to lie across the top of the window when the latter is in its fully opened position.

References Cited in the file of this patent

UNITED STATES PATENTS

| | | |
|---|---|---|
| 1,836,511 | Severns | Dec. 15, 1931 |
| 2,173,569 | Troendle | Sept. 19, 1939 |
| 2,430,049 | Flory | Nov. 4, 1947 |
| 2,531,233 | Pettit | Nov. 21, 1950 |
| 2,584,557 | Cutherbertson | Feb. 5, 1952 |
| 2,592,032 | Henderson | Apr. 8, 1952 |
| 2,593,222 | Tracy | Apr. 15, 1952 |
| 2,704,224 | Banks | Mar. 15, 1955 |
| 2,718,445 | Wilson | Sept. 20, 1955 |